United States Patent [19]

McEntire et al.

[11] 4,049,591
[45] Sept. 20, 1977

[54] FOAMS AND ELASTOMERS PREPARED IN THE PRESENCE OF HIGH TERTIARY AMINE CONTENT POLYURETHANE CATALYSTS

[75] Inventors: Edward E. McEntire; George P. Speranza, both of Austin, Tex.

[73] Assignee: Texaco Development Corporation, New York, N.Y.

[21] Appl. No.: 733,548

[22] Filed: Oct. 18, 1976

[51] Int. Cl.² .................. C08G 18/14; C08G 18/18; C08G 18/48

[52] U.S. Cl. .................. 260/2.5 AC; 260/75 NC; 260/77.5 AC; 260/465.5 R; 260/534 R; 260/561 A; 260/562 N; 260/570.5 P; 260/584 A; 560/130; 560/157

[58] Field of Search .... 260/2.5 AC, 75 NC, 77.5 AC

[56] References Cited

U.S. PATENT DOCUMENTS

| | | | |
|---|---|---|---|
| 3,694,510 | 9/1972 | Moller et al. | 260/75 NC |
| 3,925,268 | 12/1975 | Rosemund et al. | 260/2.5 AC |
| 3,928,256 | 12/1975 | Cenker et al. | 260/2.5 AC |
| 4,007,140 | 2/1977 | Ibbotson | 260/2.5 AC |
| 4,011,223 | 3/1977 | Priest et al. | 260/2.5 AC |

Primary Examiner—H.S. Cockeram
Attorney, Agent, or Firm—Carl G. Ries; Thomas H. Whaley; James L. Bailey

[57] ABSTRACT

Covers compounds of the formula

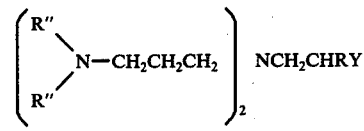

where R" is lower alkyl, R is hydrogen or lower alkyl and Y is selected from the group consisting of CN, $CONH_2$, $CO_2R'$, $CONR'_2$ and $COR'$ where R' independently is hydrogen, lower alkyl or aryl. Also covers a method of producing a polyurethane by utilizing said above compounds as catalysts in reacting an organic polyisocyanate with an organic polyester polyol or polyether polyol in the presence of said catalyst.

8 Claims, No Drawings

FOAMS AND ELASTOMERS PREPARED IN THE PRESENCE OF HIGH TERTIARY AMINE CONTENT POLYURETHANE CATALYSTS

BACKGROUND OF THE INVENTION

1. Field of the Invention

This invention pertains to the field of urethane catalysts. More particularly, this invention relates to the use of certain amines as urethane catalysts.

2. Description of the Prior Art

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain extending isocyanate-hydroxyl reaction by which a hydroxyl-containing molecule is reacted with an isocyanate-containing molecule to form a urethane. This increases the viscosity of the mixture and provides a polyurethane containing secondary nitrogen atom in the urethane groups. A second reaction is a cross-linking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of the foam. This third reaction is not essential if an extraneous blowing agent, such as a halogenated, normally liquid hydrocarbon, carbon dioxide, etc., is employed, but is essential if all or even a part of the gas for foam generation is to be generated by this in-situ reaction (e.g. in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

It has long been known that tertiary amines, such as trimethylamine, triethylamine, etc., are effective for catalyzing the second crosslinking reaction. Other typical tertiary amines are set forth in U.S. Pat. Nos. 3,925,268; 3,127,436; and 3,243,389 and German OLS 2,354,952 and 2,259,980. Some of the tertiary amines are effective for catalyzing the third water-isocyanate reaction for carbon dioxide evolution. However, tertiary amines are only partially effective as catalysts for the first chain extension reaction. To overcome this problem, the so-called "prepolymer" technique has been developed wherein a hydroxy-containing polyol component is partially reacted with the isocyanate component in order to obtain a liquid prepolymer containing free isocyanate groups. This prepolymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein a tertiary amine, such as triethylenediamine, is employed in conjunction with an organic tin compound. Triethylenediamine is particularly active for promoting the water-isocyanate reaction and the tin compound is particularly active in synergistic combination with the triethylenediamine for promoting the chain extension reaction. However, even here, the results obtained leave much to be desired. Triethylenediamine is a solid and must be dissolved prior to use to avoid processing difficulties. Also, triethylenediamine and other of the prior art amines can impart a strong amine odor to the polyurethane foam.

In addition to problems of odor and handling due to solid character, other tertiary amines suffer still further deficiencies. For example, in some instances the compounds are relatively high in volatility leading to obvious safety problems. In addition, some catalysts of this type do not provide sufficient delay in foaming, which delay is particularly desirable in molding applications to allow sufficient time to situate the preform mix in the mold. Yet other catalysts, while meeting specifications in this area do not yield foams with a desirable tack-free time.

Lastly, while certain tertiary amines are somewhat suitable in this catalytic area, they nevertheless do not have a sufficiently high tertiary amine content in terms of the number of tertiary amines compared to overall molecular weight. It is believed that the higher the tertiary amine content the more rapid the catalytic activity in the polyurethane art.

It would therefore be a substantial advance in the art if a new class of amine catalysts were discovered which overcome some of the just enumerated disadvantages of the prior art.

SUMMARY OF THE INVENTION

A new class of compounds has been discovered which have been found useful as polyurethane catalyst. These compounds have the following structural formula

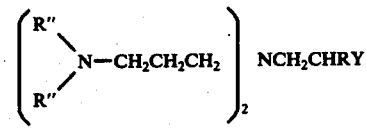

where R" is lower alkyl, R is hydrogen or lower alkyl and Y is selected from the group consisting of CN, $CONH_2$, $CO_2R'$, $CONR'_2$ and $COR'$ where R' independently is hydrogen, lower alkyl or aryl. Preferably R" contains 1–4 carbon atoms.

DESCRIPTION OF THE PREFERRED EMBODIMENTS

The compounds here may be prepared by resort to a wide variety of synthetic techniques. However, preferably these compositions are prepared by first making bis(dialkylaminopropyl)-amine. The bis-amine again may also be prepared by a variety of known techniques. However, one excellent mode of preparation involves a reaction of a dialkylamine such as dimethylamine with acrylonitrile followed by hydrogenation of the resultant condensate to produce dimethylaminopropylamine. In producing dimethylaminopropylamine, one also produces the bis-dimethylaminopropylamine compound, which may be removed from the monomolecule by conventional means such as distillation and the like.

The bis-amine then readily reacts with a variety of monomers of the type CH$_2$=CHRY where R and Y have a significance as above discussed. Typical reactants of this type include acrylamide, acrylonitrile, acrylic acid, and lower alkyl or aryl esters thereof, N,N-disubstituted acrylamide derivatives, and vinylketones such as methyl vinyl ketone, etc.

Most preferred compounds are those where R″ in the above formula in both instances is methyl. Thus, greatly preferred compositions have the formula ((CH$_3$)$_2$NCH$_2$CH$_2$CH$_2$)$_2$NX where X =
1. CH$_2$CH$_2$CN
2. CH$_2$CH$_2$CONH$_2$
3. CH$_2$CH$_2$CO$_2$CH$_3$
4. CH$_2$CH$_2$CHO
5. CH$_2$CH$_2$CO$_2$H
6. CH$_2$CH$_2$COCH$_3$
7. CH$_2$CH(CH$_3$)Y where Y = CN, CO$_2$CH$_3$, CO$_2$H, CONH$_2$, CHO
8. CH$_2$CH$_2$CO$_2$R
where R = R′ or
9. CH$_2$CH$_2$CON(R,R′)
R ≠ R′, and they are alkyl, aryl, or H.
10. CH$_2$CHR″CO$_2$R
where R″ = CH$_3$, Et, and R
11. CH$_2$CHR″CON(RR′) and R′ as above.

The compounds here possess a number of useful characteristics making them exceptionally attractive as polyurethane catalysts. For example, the just defined compounds have a high tertiary amine content and resultant rapid catalytic activity in the polyurethane foam area. Tertiary amine content is calculated as the number of tertiary amines divided by the molecular weight times 1,000. For example, the acrylonitrile adduct of bis-(dimethylaminopropyl)-amine has a tertiary amine content of 12.48 meq/g. In addition, the compounds here are also relatively non-volatile and possess little if any odor. With respect to the products, there are no solids handling problems such as are present with well known polyurethane catalysts as triethylenediamine. The catalysts of the invention are particularly desirable in foaming urethanes in that they provide a sufficient delay in the foaming operation to aid in processing. Yet the catalysts also give good foams with desirable tack-free times. As noted above this delay time is particularly desirable in molding applications to allow sufficient time to situate the prefoam mix in the mold. Lastly, the compounds are easily prepared as typically described above, and are relatively inexpensive.

To prepare polyurethanes using the catalysts here, any aromatic polyisocyanate may be used. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4′-diisocyanate, aliphatic-aromatic diisocyanates, such as xylylene-1,4-diisocyanate, xylylene-1,4-diisocyanate, xylylene-1,3-diisocyanate bis(4-isocyanatophenyl) methane, bis(3-methyl-4-isocyanatophenyl) methane, and 4,4′-diphenylpropane diisocyanate.

Greatly preferred aromatic polyisocyanates used in the practice of the invention are 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,363,979.

Most preferred methylene-bridged polyphenyl polyisocyanate mixtures used here contain from about 20 to about 100 weight percent methylene diphenyldiisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4′-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

The hydroxyl-containing polyol component which reacts with the isocyanate may suitably be a polyester polyol or a polyether polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from 350 to 700. Semi-rigid foams of a desired flexibility are provided when the hydroxyl number is intermediate to the ranges just given.

When the polyol is a polyester, it is preferable to use, as the polyester, a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids are phthalic acid, terephthalic acid, isophthalic acid, or the like, is non-ethyleneic and non-reactive. Thus, aromatic acids may be employed for the acid component. Aliphatic acids, such as succinic acid, adipic acid, sebacic acid, azelaic acid, etc., may also be employed. The alcohol component for the polyester should preferably contain a plurality of hydroxyl groups and is preferably an aliphatic alcohol, such as ethylene glycol, propylene glycol, dipropylene glycol, diethylene glycol, glycerol, pentaerthyritol, trimethyloethane, trimethylolpropane, mannitol, sorbitol, or methyl glucoside. Mixtures of two or more of the above identified alcohols may be employed also if desired. When a flexible urethane foam is desired, the polyol should preferably have an average functionality of from about 2 to about 4 and a molecular weight of from about 2,000 to about 4,000. For rigid foams, the functionality of the polyol component is preferably from about 4 to about 7.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 2000 to about 7000. For flexible polyether polyurethane foams, the alkylene oxide is preferably propylene oxide or a mixture of propylene oxide and ethylene oxide.

For rigid polyether polyurethane foams, the polyol should have a functionality of from about 4 to about 7 and a molecular weight of from about 300 to about 1200. Polyols for rigid polyether polyurethane foams may be made in various ways including the addition of an alkylene oxide as above to a polyhydric alcohol with a functionality of from 4 to 7. These polyols may also be, for example, Mannich condensation products of a phenol, an alkanolamine, and formaldehyde, which Mannich condensation product is then reacted with an alkylene oxide. See U.S. Pat. No. 3,297,597.

The amount of hydroxyl-containing polyol compound to be used relative to the isocyanate compound in both polyester and polyether foams normally should be such that the isocyanato groups are present in at least an equivalent amount, and preferably, in slight excess, compared with the free hydroxyl groups. Preferably, the ingredients will be proportioned so as to provide from about 1.05 to about 1.5 mol equivalents of isocyanato groups per mol equivalent of hydroxyl groups. However, for certain shock absorbing foams we have found that by using the catalysts of our invention the mol equivalents of isocyanate to hydroxyl groups can be as low as 0.4.

When water is used, the amount of water, based on the hydroxyl compound, is suitably within the range of about 0.05 to about 5.0 mol per mol equivalent of hydroxy compound.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc., may be used. The inert blowing agent reduces the amount of excess isocyanate and water that is required in preparing flexible urethane foam. For a rigid foam, it is preferable to avoid the use of water and to use exclusively the extraneous blowing agent. Selection of the proper blowing agent is well within the knowledge of those skilled in the art. See for example U.S. Pat. No. 3,072,082.

The catalysts discovered here are useful in the preparation of rigid or flexible polyester or polyether polyurethane foams based on the combined weight of the hydroxyl-containing compound and polyisocyanate, are employed in an amount of from about 0.05 to about 4.0 weight percent. More often that the amount of catalyst used is 0.1–1.0 weight percent.

The catalysts of this invention may be used either alone or in a mixture with one or more other catalysts such as other tertiary amines or with an organic tin compound or other polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such other tertiary amines include trialkylamines (e.g. trimethylamine, triethylamine), heterocyclic amines, such as N-alkylmorpholins (e.g., N-methylmorpholine, N-ethylmorpholine, etc.), 1,4-dimethylpiperazine, triethylenediamine, etc., aliphatic polyamines, such as N,N,N'N'-tetramethyl-1,3-butanediamine.

Conventional formulation ingredients are also employed, such as, for example, foam stabilizers also known as silicone oils or emulsifiers. The foam stabilizer may be an organic silane or siloxane. For example, compounds may be used having the formula:

$RSi[O—(R_2SiO)_n—(oxyalkylene)_mR]_3$ wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (e.g., 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

When it is desired to prepare rigid foams, the "one-shot" method or the so-called "quasi-prepolymer method" is employed, wherein the hydroxyl-containing component preferably contains from about 4 to 7 reactive hydroxyl groups, on the average, per molecule.

In accordance with the "quasi-prepolymer method", a portion of the hydroxyl-containing component is reacted in the absence of a catalyst with the polyisocyanate component in proportions so as to provide from about 20 percent to about 40 percent of free isocyanato groups in the reaction product, based on the polyol. To prepare a foam, the reamining portion of the polyol is added and the two components are allowed to react in the presence of catalytic systems such as those discussed above and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the prepolymer or remaining polyol, or both, prior to the mixing of the component, whereby at the end of the reaction a rigid polyurethane foam is provided.

Urethane elasomers and coatings may be prepared also by known techniques in accordance with the present invention wherein a tertiary amine of this invention is used as a catalyst. See, for example, duPont Bulletin PB-2, by Remington and Lorenz, entitled "The Chemistry of Urethane Coatings".

The invention will be illustrated further with respect to the following specific examples, which are given by way of illustration and not as limitations on the scope of this invention.

EXAMPLE 1

To a 500 ml reactor equipped with a stirrer, thermometer and nitrogen atmosphere was charged 187 g of bis-(dimethylaminopropyl)-amine (BDMAPA) and 103 g of isopropanol. Acrylonitrile, 64 g, was added and the solution was refluxed 1 hour, then 8 g more acrylonitrile was added. Reflux was continued 2 hours, then excess acrylonitrile and isopropanol were distilled overhead. A vacuum, of 0.8 mm was applied for 0.5 hours to remove traces of volatiles, and the product was recovered in quantitative yield. Its identity as N-cyanoethyl-N,Nbis-(dimethylaminopropyl)-amine was confirmed by infrared and nmr spectroscopy. The flash point of this compound was desirably high, 190° F.

EXAMPLE 2

To an apparatus similar to that used in Example 1 was charged 112 g of BDMAPA. Dropwise addition of 86 g of a 50% solution of acrylamide produced a moderate exotherm. After the addition the mixture was heated at 50° to 60° C for 3 hours. The water was removed by benzene azeotrope followed by vacuum application at 0.4 mm of mercury for 2 hours. The product was recovered in quantitative yield and had no detectable odor. IR and NMR spectroscopy confirmed the identity of the compound as 3-(bis-(dimethylaminopropyl)amino)-propionaide.

EXAMPLE 3

This example illustrate the utility of the catalysts here in a flexible urethane formulations. A high speed stirrer was used to mix 48.4 parts of toluene diisocyanate with the following blend of components:

| | | |
|---|---|---|
| THANOL® F-3520 Polyol[1] | 100 | parts |
| Water | 4 | parts |
| Silicone surfactant | 1 | part |
| Tin catalyst | 0.6 | parts |
| Test catalyst | 0.1 | parts |

[1]A glycerine based polyether polyol of 3500 molecular weight containing 15% ethylene oxide available from Jefferson Chemical Co., Houston, Texas.

The blended components were poured into a standard mold and allowed to rise. The observed properties are recorded below:

| Expt. | Test Catalyst | Cream time (sec) | Rise time (sec) | Foam Appearance |
|---|---|---|---|---|
| 1 | Catalyst-Example 1 | 12 | 100 | Good |
| 2* | Catalyst-Example 1 | — | 83 | Good |
| 3 | Catalyst-Example 2 | 13 | 97 | Good |
| 4** | Catalyst-Example 2 | — | 85 | Good |

*0.13 parts catalyst used.
**0.2 parts catalyst used.

EXAMPLE 4

Here the catalyst of Example 1 was employed in another formulation to produce a packaging foam. The formulation was as follows:

| Foam Ingredients | Parts |
|---|---|
| THANOL® SF-2750[1] | 100 |
| Water | 20 |
| Chlorotrifluoromethane blowing agent | 35 |
| Silicone surfactant | 1.5 |
| Catalyst, Example 1 | 3.0 |
| T-12 | 0.02 |
| MONDUR® MR Polyisocyanate[2] | 140.5 |
| NCO/OH | 0.4 |
| Details | |
| Cream time, sec. | ~12 |
| Rise time, sec. | ~50 |
| Gel time, sec. | ~55 |

[1]A packaging foam polyol available from Jefferson Chemical Co., Inc., Houston, Texas
[2]Polyphenylmethylene polyisocyanate of average functionality of 2.7, a product of Mobay Chemical Corp.

As can be seen above cream, rise and gel times are all acceptable.

EXAMPLE 5

This example illustrates use of the urethane catalysts here in a rigid urethane formulation. The components below were blended with a high speed stirrer, then poured into a standard mold and allowed to rise.

| | |
|---|---|
| MONDUR® MR polyisocyanate | 46.6 parts |
| 2500 parts THANOL® RS-700 polyol[1] | |
| 34 parts silicone surfactant | 52.4 parts |
| 880 parts fluorocarbon blowing agent | |
| Catalyst tested | 1.0 part |

[1]A nine mol propoxylate of sorbitol.

The rise characteristics observed were recorded below:

| Catalyst tested | Cream time (sec) | Tack free time (sec) | Rise time (sec) |
|---|---|---|---|
| Catalyst - Example 1 | 40 | 145 | 150 |
| Catalyst - Example 1* | 35 | 110 | 120 |
| Catalyst - Example 2 | 41 | 140 | 150 |
| Catalyst - Example 2* | 37 | 105 | 120 |

*1.25 parts catalyst used.

We claim:

1. A method for producing a polyurethane which comprises reacting an organic polyisocyanate with an organic polyester polyol or polyether polyol in the presence of a catalytic amount of a compound having the following structural formula:

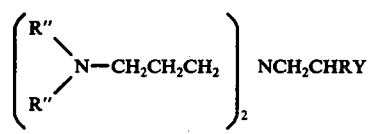

where R" is lower alkyl, R is hydrogen or lower alkyl and Y is selected from the group consisting of CN, CONH$_2$, CO$_2$R', CONR'$_2$ and COR' where R' is independently hydrogen, lower alkyl or aryl.

2. The method of claim 1 wherein said organic polyisocyanate has a functionality of from 2 to 4, and said organic polyester or polyether polyol has a hydroxyl number of from about 25 to 700.

3. The method of claim 1 where R" in said structural formula is methyl.

4. The method of claim 3 wherein Y is CN and R is hydrogen.

5. The method of claim 3 wherein Y is CONR'$_2$ and R and R' are hydrogen.

6. The method of claim 2 wherein a flexible polyether polyurethane foam is provided which comprises reacting in the presence of a blowing agent said organic polyisocyanate with a polyether polyol formed by the addition of a polyhydric alcohol having a functionality of from 2 to about 4 with an alkylene oxide of 2 to 4 carbon atoms in the presence of said catalyst, said organic polyisocyanate being employed in an amount sufficient to provide 0.4 to 1.5 mol equivalents of isocyanato groups per mol equivalent of hydroxyl groups, said polyether polyol having a molecular weight within the range of about 2000–7000.

7. The method of claim 2 wherein a rigid polyether polyurethane foam is provided by reacting in the presence of a blowing agent said organic polyisocyanate with a hydroxy terminated polyether in the presence of said catalyst, said polyisocyanate being employed in an amount sufficient to provide 0.4 to 1.5 mol equivalents of isocyanato groups per mol equivalent of a hydroxy group in the hydroxy terminated polyether, said polyether having from about 4 to about 7 hydroxy groups per molecule, a molecular weight within the range from 300 to about 1200 and a hydroxyl number within the range of 350 to 700.

8. The method of claim 2 wherein a flexible polyester polyurethane foam is prepared which comprises reacting in the presence of a blowing agent toluene diisocyanate with a hydroxyl terminated condensation product of a polycarboxylic acid and a polyhydric alcohol in the presence of said catalyst, said toluene diisocyanate being employed in an amount sufficient to provide 1.0 to 1.5 mol equivalents of isocyanato groups per mol equivalent of hydroxyl groups, said condensation product having a functionality of from about 2 to about 4, and a molecular weight from about 2,000 to about 4,000, and a hydroxyl number ranging from about 25 to about 60.

* * * * *